(12) United States Patent
Kiljander et al.

(10) Patent No.: US 6,480,185 B1
(45) Date of Patent: Nov. 12, 2002

(54) ELECTRONIC DEVICE WITH TRACKBALL USER INPUT

(75) Inventors: Harri J Kiljander, Irving, TX (US); Douglas A Deeds, Fort Worth, TX (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/362,367

(22) Filed: Jul. 28, 1999

(51) Int. Cl.7 .................................................. G09G 5/08
(52) U.S. Cl. ...................... 345/167; 345/163; 345/164; 345/156
(58) Field of Search ................................. 345/167, 163, 345/156, 157, 158

(56) References Cited

U.S. PATENT DOCUMENTS

| | | | |
|---|---|---|---|
| 3,891,143 A | | 6/1975 | Haeusler ..................... 235/437 |
| 4,575,086 A | * | 3/1986 | Kim et al. .................... 74/417 |
| 4,739,128 A | | 4/1988 | Grisham ..................... 200/6 A |
| 5,156,475 A | * | 10/1992 | Zilberman ................... 400/472 |
| 5,394,169 A | * | 2/1995 | Tseng .......................... 345/167 |
| 5,436,954 A | | 7/1995 | Nishiyama et al. .......... 455/566 |
| 5,751,275 A | * | 5/1998 | Bullister ...................... 345/167 |
| 5,784,052 A | * | 7/1998 | Keyson ........................ 345/167 |
| 5,825,353 A | | 10/1998 | Will ............................ 345/184 |
| 5,901,222 A | * | 5/1999 | Macor .......................... 379/433 |
| 6,172,665 B1 | * | 1/2001 | Bullister ...................... 345/163 |

FOREIGN PATENT DOCUMENTS

| | | |
|---|---|---|
| EP | 0463856 | 1/1992 |
| EP | 0588210 | 3/1994 |
| EP | 0669715 | 8/1995 |
| EP | 0679003 | 10/1995 |
| EP | 0715441 | 6/1996 |
| GB | 2 260 598 | 4/1993 |
| GB | 2 318 945 | 5/1998 |

* cited by examiner

*Primary Examiner*—Mark Zimmerman
*Assistant Examiner*—Mackly Monestime
(74) *Attorney, Agent, or Firm*—Harrington & Smith, LLP

(57) ABSTRACT

A portable radio telephone comprising a housing, a transceiver located in the housing, a controller connected to the transceiver, a display connected to the controller, and a user input device connected to the controller. The user input device comprises a trackball movably connected to the housing and at least one trackball rotational position sensor connected to the controller for sensing rotational movement of the trackball. The sensor includes a roller which rides against an exterior surface of the trackball. The user input device is configured to provide biased stepwise movements of the roller as the trackball is rotated by a user.

26 Claims, 3 Drawing Sheets

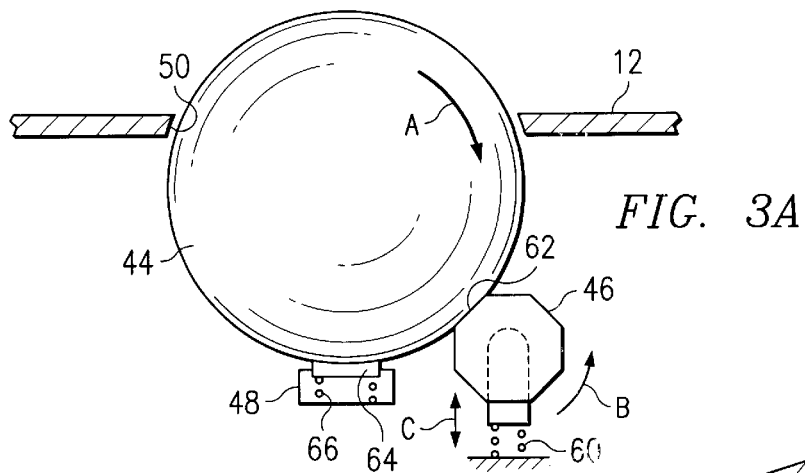
FIG. 3A
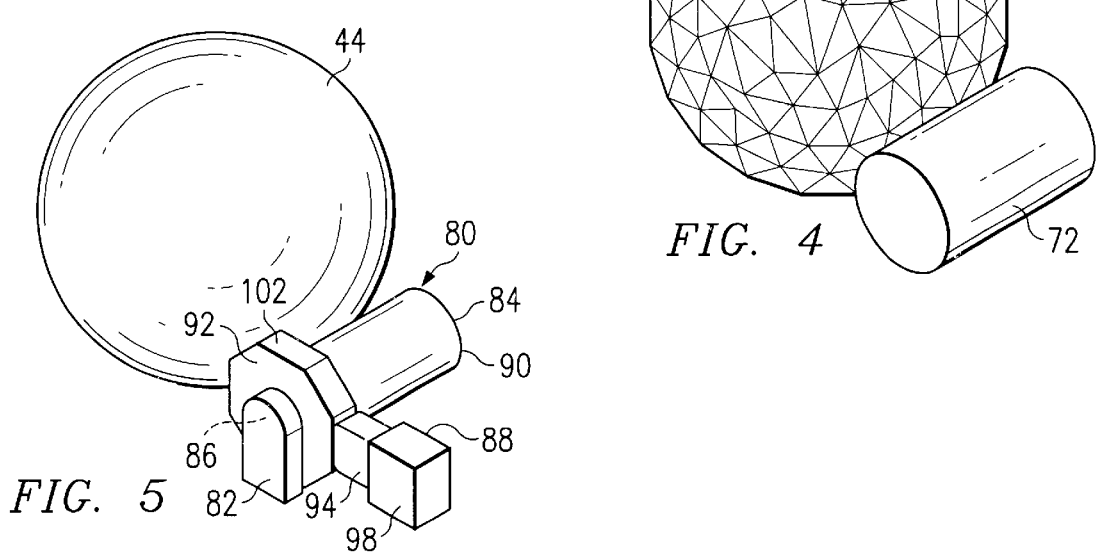
FIG. 4
FIG. 5
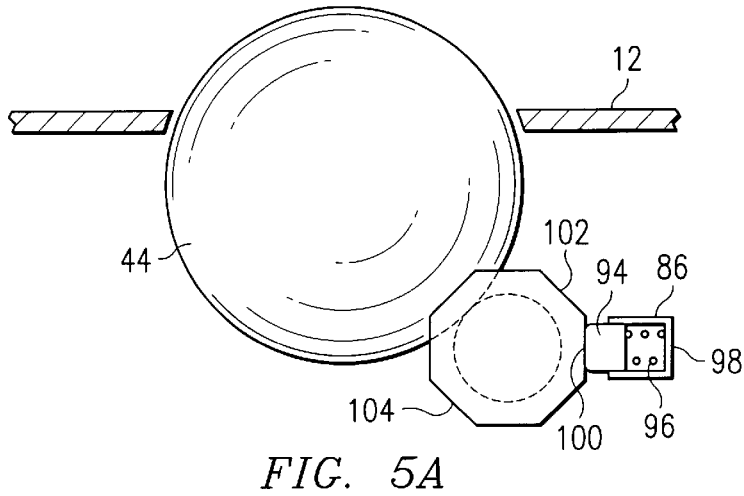
FIG. 5A

ELECTRONIC DEVICE WITH TRACKBALL USER INPUT

BACKGROUND OF THE INVENTION

1. Field of the Invention

The present invention relates to an electronic component input device and, more particularly, to a trackball used with an electronic device, such as, for example, a telephone.

2. Prior Art

Radio telephone handsets have displays where text and graphics are displayed. A user can scroll through a menu or telephone numbers or even play games by use of arrow keys (Up/Down and/or Left/Right) on the handset. Another type of radio telephone handset interface has a roller key that rolls along a single axis. However, operating two arrow keys or a roller key and an arrow key in order to obtain a desired movement, requires the user to use more than one finger on the keys or, if only one finger is used, lift the finger between keys. This makes it harder to use the keys without actually looking at the keypad of the handset.

SUMMARY OF THE INVENTION

In accordance with one embodiment of the present invention, a trackball user input device is provided comprising a user actuated trackball; and a first trackball position sensor located at an exterior side of the trackball. The sensor comprises a first roller rotatably contacting the exterior side of the trackball. The trackball is rotatable about orthogonal axes and the exterior side of the trackball or the sensor is shaped to provide a predetermined biased stepped movement of the roller as the trackball and roller are rotated relative to each other.

In accordance with another embodiment of the present invention, a portable radio telephone is provided comprising a housing, a transceiver located in the housing, a controller connected to the transceiver, a display connected to the controller, and a user input device connected to the controller. The user input device comprises a trackball movably connected to the housing and at least one trackball rotational position sensor connected to the controller for sensing rotational movement of the trackball. The sensor includes a roller which rides against an exterior surface of the trackball. The user input device is configured to provide biased stepwise movements of the roller as the trackball is rotated by a user.

In accordance with another embodiment of the present invention an electronic device is provided having a display, a controller connected to the display, and a user input connected to the controller. The improvement comprises the user input including a trackball extending through a hole in a housing which partially encloses the trackball, rotational position tracking sensors connected to the controller and having rollers supported against an exterior surface of the trackball, and a trackball depression sensor connected to the controller for sensing depression of the trackball by a user in a direction into the housing. The trackball is both rotatable relative to the housing and depressable into the housing between a home position and a depressed position.

In accordance with one method of the present invention, a method of controlling movement of a trackball in a user interface for an electronic device is provided comprising steps of providing a biased stepwise detent positioning system for predetermined stepped rotational movement of rollers of trackball position sensors located against an exterior side of the trackball; rotating the trackball by a user; and locating the rollers at predetermined stepped positions when the user stops rotating the trackball.

BRIEF DESCRIPTION OF THE DRAWINGS

The foregoing aspects and other features of the present invention are explained in the following description, taken in connection with the accompanying drawings, wherein:

FIG. 3A is a partial cross-sectional view of the components shown in FIG. 3 and a portion of the telephone handset housing;

FIG. 4 is a partial schematic perspective view as in FIG. 3 of components of an alternate embodiment of the user input device;

FIG. 5 is a partial schematic perspective view of components of another alternate embodiment of the user input device; and FIG. 5A is a partial cross-sectional view of the components shown in FIG. 5 and a portion of the telephone housing.

DETAILED DESCRIPTION OF THE PREFERRED EMBODIMENT

Figure 1:
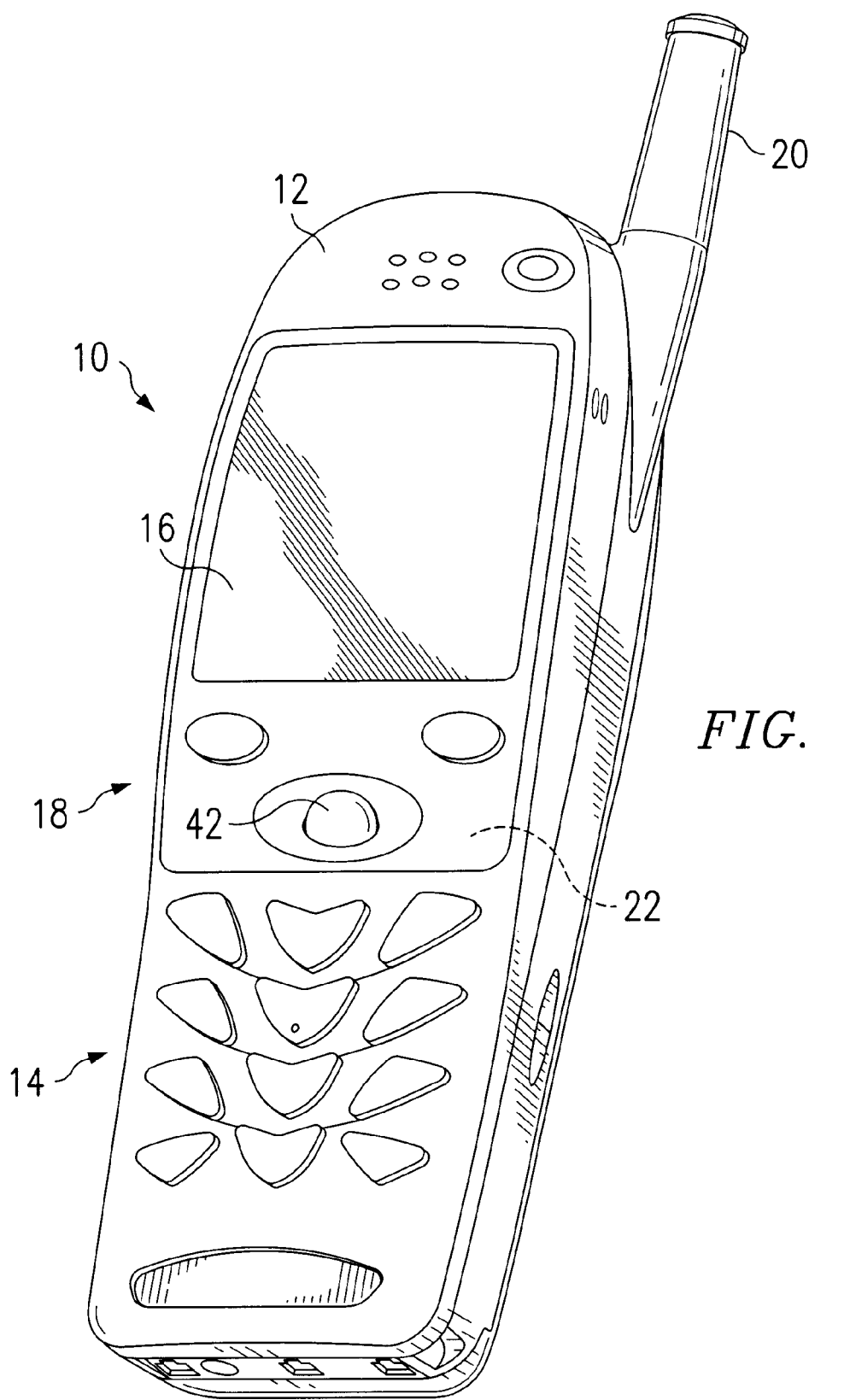
FIG. 1 is a perspective view of a radio telephone handset incorporating features of the present invention.

Referring to FIG. 1, there is shown a perspective view of a radio telephone handset 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The telephone 10 generally comprises a housing 12, a keypad 14, a display 16, a menu/function input section 18, an antenna 20, and electronic circuitry 22 located inside the housing 12. Virtually all the items in the telephone 10, except the input section 18 and the software relating thereto, are well known in the art and will not be described in further detail herein. Features of the input section 18 could also be used in other types of electronic devices, telephones, telephone handsets, and hand-held pocket size communicators, and are not limited to radio telephone handsets.

Figure 2:
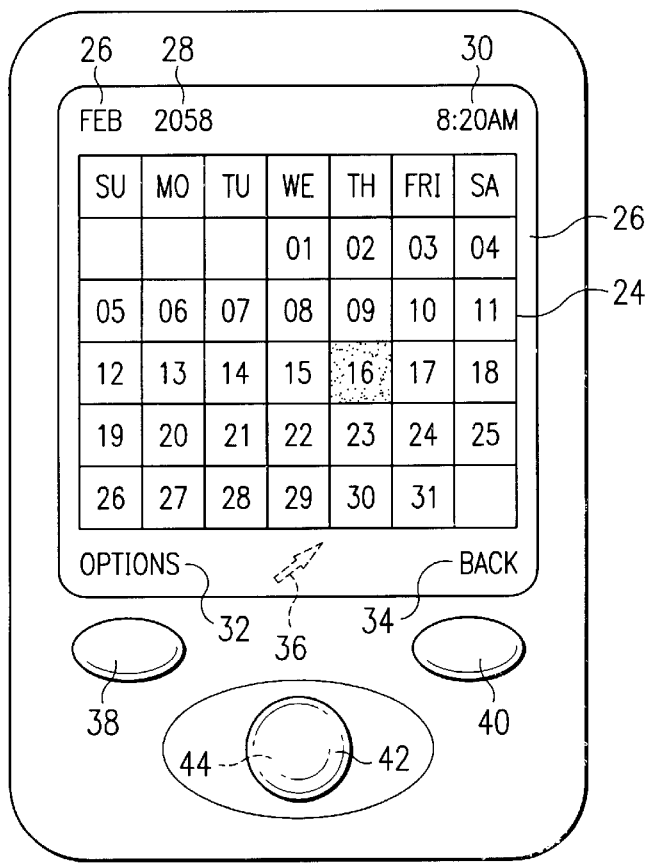
FIG. 2 is a schematic front elevational view of the display and menu/function keys of the handset shown in FIG. 1.
Figure 3:
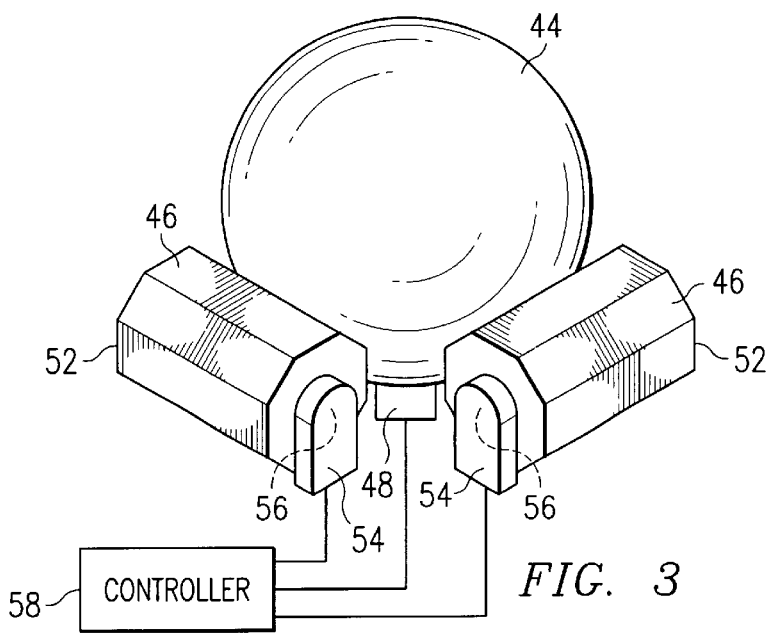
FIG. 3 is a perspective view of components of the user input device shown in FIG. 2.

Referring also to FIG. 2, the display 16 can be any suitable type of display, such as an LCD display. In this figure the display is showing indicia of a calendar 24, a month 26, a year 28, a time 30, an options icon 32 and a back icon 34. The display could also have a movable cursor 36. However, the display 16 could be used to display any suitable indicia or picture. In this embodiment the menu/function input section 18 is located below the display 16 and generally comprises two buttons 38, 40 and a user input device 42. However, the two buttons 38, 40 need not be provided or addition buttons could be provided. Referring also to FIGS. 3 and 3A, the input device 42 generally comprises a trackball 44, trackball rotational position sensors 46, and a selector switch 48. In this embodiment the trackball 44 is round with a substantially smooth exterior. The front face of the housing 12 has a hole 50 which the trackball extends out of. The diameter of the hole 50 is smaller than the diameter of the trackball 44 such that the housing 12 keeps the trackball from falling out of the housing.

In this embodiment the input device 42 has two of the rotational position sensors 46 oriented orthogonal to each other. However, in alternate embodiments more or less than two rotational position sensors could be provided and they could be orientated at any suitable orientation relative to each other. Preferably, the sensors 46 are spring loaded or biased against the trackball 44. In this embodiment the sensors 46 each comprise a roller 52 and a frame 54. The frame 54 supports the roller 52 for rotational movement about a longitudinal axis its respective roller 52. Each frame 54 and roller 52 also include a relative positioning sensor 56 to sense rotation of the roller 52 relative to the frame 54.

The sensors 56 are electrically connected to a controller 58 of the electronic circuitry 22, such as a microprocessor. In this embodiment the rollers 52 comprise polygon cylinders. The polygon cylinders rest against the exterior surface of the trackball 44. The surfaces of the trackball 44 and the rollers 52 have suitable frictional properties such that rotation of the trackball 44 by a user's finger, such as indicated by arrow A, causes at least one of the rollers 52 to rotate as indicated by arrow B. The spring bias of the frame 54 by the spring 60 allows the sensor 46 to compensate for movement in direction C as the trackball 44 and roller 46 rotate with each other. Rotation of the roller 52 may have non-uniform rotation relative to rotation of the trackball 44 because of the non-curved exterior surface of the rollers 52. The controller 58 could be programmed to convert the signals received from the sensors 56 into signals of an equivalent circular roller. Although the rollers 52 are shown as uniform six sided members, the rollers 52 could have any suitable number of sides and/or could have non-uniform sides (other than flat surfaces), such as with notches or grooves at edges or junctions of the sides of the polygon. In this embodiment the rollers 52 can be used to help prevent the trackball 44 from unintentionally rotating by holding the trackball stationary with the frame 12 until positively moved by a user's finger. The non-curved exterior shapes of the rollers 52 in combination with the springs 60, trackball 44 and housing 12 can also be used to position the rollers 52 at predetermined positions when the user releases the trackball 44; the rollers 52 being biasingly moved such that a flat 62 rests against the exterior side of the trackball 44. However, predetermined positioning at rest and/or steady holding of the trackball at rest need not be provided.

The selector switch 48 preferably comprises a plunger 64 biased by a spring 66 against the exterior of the trackball 44 at the bottom of the trackball. The switch 48 is electrically connected to the controller 58. A user can depress the trackball 44 into the housing 12. This causes the plunger 64 to be depressed and send a signal to the controller 58. This signal can be used, similar to a signal from a button on a computer mouse, to perform a selection function or display menus on the display 16. The springs 60, 66 combine to bias the trackball 44 back to a home position against the frame 12 at the hole 50. In an alternate embodiment the selector switch 48 need not be provided.

Referring now to FIG. 4, a partial schematic perspective view of an alternate embodiment is shown. In this embodiment the trackball 70 has an exterior surface which is not smoothly curved. Instead, the exterior surface has a plurality of flats 70 to form an edgy or cornered trackball. In alternate embodiments the exterior surface could have any suitable shape exterior side sections including notches or grooves at edges or junctions of the side sections. In this embodiment the rollers 72 have uniformly curved or rounded exterior sides. Thus, the same type of stepped progression or movement can be provided for the roller 72 by rotation of the trackball 70 as in the embodiment shown in FIGS. 3 and 3A.

Referring now to FIGS. 5 and 5A, another alternate embodiment will be described. In this embodiment the trackball 44 has a substantially uniform curved exterior. The rotational position sensors 80 (only one of which is shown) generally comprise a frame 82, a roller 84, a relative position sensor 86, and a positioner 88. The frame 82 and the sensor 86 are substantially the same as the frame 54 and the sensor 56 described with reference to FIGS. 3 and 3A. The roller 84 generally comprises a cylinder 90 and a disk 92. The cylinder 90 has a uniformly curved exterior surface. The disk 92 is fixedly and stationarily connected to an end of the cylinder 90. In this embodiment the disk 92 has a polygon shaped outer perimeter. However, in alternate embodiments other shapes of the outer surfaces of the disk and/or cylinder could be provided. When the cylinder 90 is rotated by the trackball 44, the disk 92 rotates with the cylinder 90. The positioner 86 generally comprises a rider 94, a spring 96 and a supporting frame 98. The supporting frame 98 is fixedly connected to a portion of the housing 12. The rider 94 is movable in and out of the supporting frame 98. The spring 96 biases the rider 94 in an outward direction relative to the supporting frame 98. The rider 94 has a front face 100 that is biased against the side perimeter 102 of the disk 92. When the roller 84 is rotated by rotation of the trackball 44, the disk 92 rides against the rider 94 with the rider 94 moving in and out of the supporting frame 98. When the user releases the trackball 44 the spring 96 biases the rider 94 towards the disk 92 to cause the roller 90 to rotate such that the rider 94 rests against one of the side sections 104 of the side perimeter 102. Thus, when the input device is released to rest, the positioner 88 and the disk 92 locate the roller 84 to a predetermined position. In an alternate embodiment any suitably type of biasing means could be used as the positioner including a one-piece cantilevered type of leaf spring rider member. In addition, any suitable type of predetermined position location system between the roller and a rider could be provided. In another alternate embodiment, the user input device could comprise a mouse-type touch pad or a mouse-type pointer joystick wherein the software could be programmed to provide stepwise progressions on the display (i.e.: time delays between movements on the display). However, the trackball system described above with stepwise predetermined position locating/movement of the rollers is preferred.

With the present invention the trackball is rotatable about orthogonal axes and the exterior side of the trackball or the sensor is shaped to provide a predetermined biased stepped movement of the roller as the trackball and roller are rotated relative to each other. The trackball position sensors are located at an exterior side of the trackball with an offset of 90° from each other. The first roller can comprise a polygon cylinder. The exterior side of the trackball can comprise stepped surfaces angled relative to each other to form a general polygonal sphere. The stepped surfaces can comprise flat surfaces. The stepped surfaces can comprise grooves at edges between the stepped surfaces. The roller can be movably biased against the trackball for movement orthogonal to an axis of rotation of the roller as the roller and trackball are rotated relative to each other. The trackball can be linearly movable along one of the orthogonal axes between a home position and a depressed position, and wherein the input device can further comprise a depression sensor for sensing when the trackball is moved by a user to the depressed position.

A method of controlling movement of a trackball in a user interface for an electronic device can be provided comprising steps of: providing a biased stepwise detent positioning system for predetermined stepped rotational movement of rollers of trackball position sensors located against an exterior side of the trackball; rotating the trackball by a user; and locating the rollers at predetermined stepped positions when the user stops rotating the trackball.

The stepwise progression of the rollers of the input device of the present invention is particularly useful in telephone and communicator handsets which have traditionally been programmed to interact with the user through single axis input moving devices such as button keys and/or a roller key. For example, scrolling through a menu in a radio telephone handset in the prior art merely had the user repeated press the same menu button. The input device of the present invention can scroll through a menu by the user merely rotating the trackball in a single direction, such as upward or downward, with a resulting stepwise progression through display of the menu. As another example, with reference to FIG. 2, the user can move the highlighted area (shown at the day "16") in stepwise progressions up and down and right and left without having to scroll through each day. For example to get from the highlighted area of day "16" to day "24" the user merely needs to move the trackball one stepwise progression down and one stepwise progression right. This is much more convenient and faster than having to scroll through days "17" through "24" in order to get to day "24". Thus, the input device of the present invention is particularly well adapted to displays having stepwise progression interaction with the user and is also particularly well adapted for small devices (such as with telephone handsets becoming smaller) to prevent the user interface from being too clumsy for the user's relatively large fingers where a user would too easily over-shoot his intended destination on the display. The stepwise rotations of the rollers allow for stepwise movements of the menu or telephone numbers on the display 16 and/or stepwise movements of a cursor or cursor-equivalent on the display 16. This is particularly useful for small hand-held electronic devices.

Mobile handsets are starting to provide access to services and applications that require four-way scrolling. This invention further enhances the roller to provide Up/Down/Left/Right scrolling in convenient steps. Mobile handset user interfaces usually do not require free cursor positioning, but instead rely on moving the focus on the display one row or one cell at a time. The present device is a trackball with supporting mechanics to facilitate rolling the trackball in small steps; between each step there is a 'rest point' so that the user can conveniently roll the trackball in one-step increments in Up/Down/Left/Right directions. The 'rest point' feature can be implemented by making the rolling ball consist of small hexagons/octagons or making the ball-supporting cylinders cornered instead of being round. The device can be further improved by facilitating clicking; i.e.: pressing the trackball down and releasing it to perform a selection function in the user interface. The cylinders are used to transfer the rotary motion of the trackball to electronic signals using some optical or mechanical method.

The present invention facilitates four-way scrolling, and makes it easier for the user to operate the mobile handset without looking at the keypad (e.g. improves driving safety). The present invention is intended to make it easier for the user to use features on the display without looking away from the display to the keypad. The present invention also requires less area on the front face of the telephone handset than the multiple keys of the prior art telephone handsets.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A trackball user input device comprising:
   a user actuated trackball; and
   a first trackball position sensor located at an exterior side of the trackball, the sensor comprising a first roller rotatably contacting the exterior side of the trackball, wherein the trackball is rotatable about orthogonal axes and the exterior side of the trackball or the sensor is shaped to provide a predetermined biased rotational stepped movement of the roller as the trackball and roller are rotated relative to each other.

2. A device as in claim 1 further comprising a second trackball position sensor located at an exterior side of the trackball comprising a second roller offset 90° from the first roller.

3. A device as in claim 2 further comprising means for supporting the trackball against the rollers.

4. A device as in claim 1 wherein the first roller comprises a polygon cylinder.

5. A device as in claim 1 wherein the exterior side of the trackball comprises stepped surfaces angled relative to each other to form a general polygonal sphere.

6. A device as in claim 5 wherein the stepped surfaces comprise flat surfaces.

7. A device as in claim 5 wherein the stepped surfaces comprise grooves at edges between the stepped surfaces.

8. A device as in claim 1 wherein the roller is movably biased against the trackball for movement orthogonal to an axis of rotation of the roller as the roller and trackball are rotated relative to each other.

9. A device as in claim 1 wherein the first roller comprises a circular outer perimeter and the sensor further comprises a polygonal disk stationarily connected to the first roller and a rider biased against the polygonal disk for locating the disk at predetermined rotational positions.

10. A device as in claim 1 wherein the trackball is linearly movable along one of the orthogonal axes between a home position and a depressed position, and wherein the input device further comprises a depression sensor for sensing when the trackball is moved by a user to the depressed position.

11. In a portable radio telephone comprising a housing, a transceiver located in the housing, a controller connected to the transceiver, a display connected to the controller, and a user input device connected to the controller, wherein the improvement comprises:
    the user input device comprises a trackball movably connected to the housing and at least one trackball rotational position sensor connected to the controller for sensing rotational movement of the trackball, wherein the sensor includes a roller which rides against an exterior surface of the trackball, and wherein the user input device is configured to provide biased stepwise rotational movements of the roller as the trackball is rotated by a user.

12. A telephone as in claim 11 wherein the input device comprises only two of the rotational position sensors which are spaced about 90° apart.

13. A telephone as in claim 11 wherein the input device includes means for biasing the trackball towards the at least one trackball rotational position sensor.

14. A telephone as in claim 11 wherein the roller comprises a polygon cylinder.

15. A telephone as in claim 11 wherein the exterior side of the trackball comprises stepped surfaces angled relative to each other to form a general polygonal sphere.

16. A telephone as in claim 15 wherein the stepped surfaces comprise flat surfaces.

17. A telephone as in claim 15 wherein the stepped surfaces comprise grooves at edges between the stepped surfaces.

18. A telephone as in claim 11 wherein the roller is movably biased against the trackball and can move orthogonal to an axis of rotation of the roller as the roller and trackball are rotated relative to each other.

19. A telephone as in claim 11 wherein the roller comprises a circular outer perimeter and the sensor further comprises a polygonal disk stationarily connected to the roller and a rider biased against the polygonal disk for locating the disk at predetermined rotational positions.

20. A telephone as in claim 11 wherein the trackball is linearly movable along an axis between a home position and a depressed position into the housing, and wherein the input device further comprises a depression sensor for sensing when the trackball is moved by a user to the depressed position.

21. In an electronic device having a display, a controller connected to the display, and a user input connected to the controller, wherein the improvement comprises:

the user input including a trackball extending through a hole in a housing which partially encloses the trackball, rotational position tracking sensors connected to the controller and having rollers supported against an exterior surface of the trackball, the trackball being rotatable about orthogonal axes and the exterior side of the trackball or at least one of the sensors being shaped to provide a predetermined biased rotational stepped movement of the roller as the trackball and roller are rotated relative to each other, and a trackball depression sensor connected to the controller for sensing depression of the trackball by a user in a direction into the housing, wherein the trackball is both rotatable relative to the housing and depressible into the housing between a home position and a depressed position.

22. A method of controlling movement of a trackball in a user interface for an electronic device, the method comprising steps of:

providing a biased stepwise detent rotational positioning system for providing predetermined stepped rotational movement of rollers of trackball position sensors located against an exterior side of the trackball;

rotating the trackball by a user; and locating the rollers at predetermined stepped positions when the user stops rotating the trackball.

23. A method as in claim 22 wherein the step of providing a detent positioning system comprises providing the exterior side of the trackball with stepped surfaces angled relative to each other to form a general polygonal sphere.

24. A method as in claim 22 wherein the step of providing comprises the rollers being movably biased against the trackball for movement orthogonal to respective axes of rotation of the rollers as the rollers and trackball are rotated with each other.

25. A method as in claim 22 wherein the step of providing comprises the rollers having an exterior polygon shape for rotating against the exterior side of the trackball.

26. A method as in claim 22 wherein the step of providing comprises stationarily attaching polygon disks to respective ends of the rollers and providing riders biased against the disks for locating the disks at predetermined rotational positions.

* * * * *